July 24, 1923.
F. H. BROWN
1,463,141
METHOD OF CONTROLLING COMBUSTION
Original Filed March 28, 1917    2 Sheets-Sheet 1
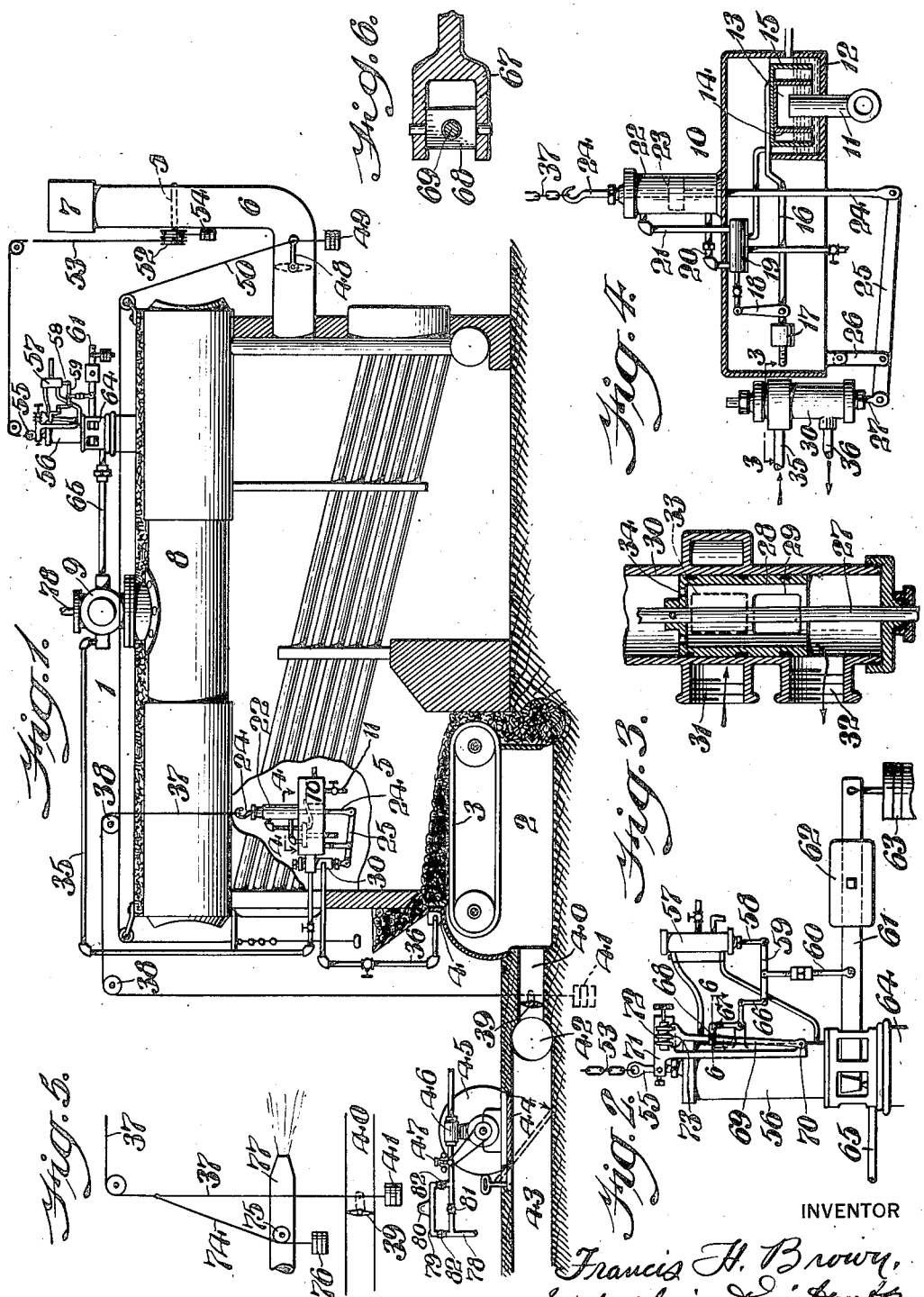
INVENTOR
Francis H. Brown,
BY
ATTORNEYS

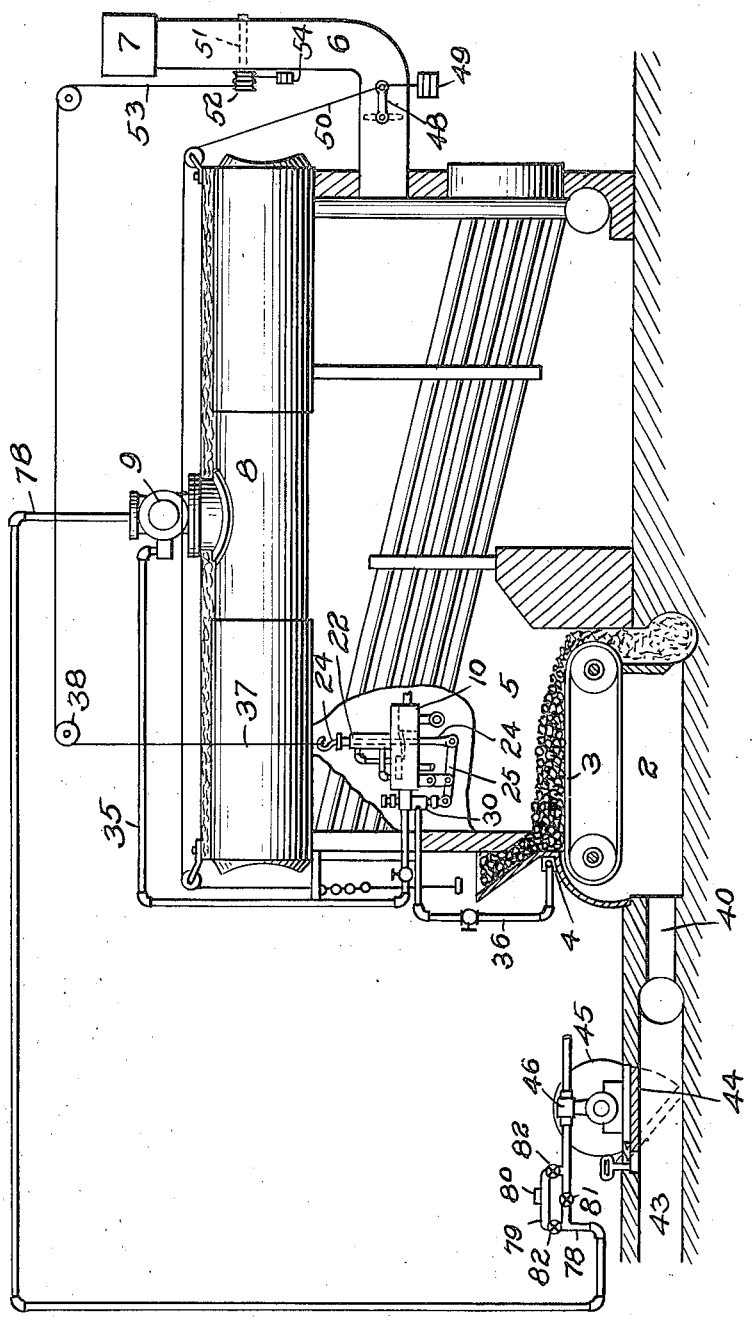

Patented July 24, 1923.

1,463,141

UNITED STATES PATENT OFFICE.

FRANCIS H. BROWN, OF PHILADELPHIA, PENNSYLVANIA, ASSIGNOR, BY MESNE ASSIGNMENTS, TO THE HAGAN CORPORATION, OF PITTSBURGH, PENNSYLVANIA, A CORPORATION OF PENNSYLVANIA.

METHOD OF CONTROLLING COMBUSTION.

Application filed March 28, 1917, Serial No. 157,921. Renewed April 16, 1923.

*To all whom it may concern:*

Be it known that I, FRANCIS H. BROWN, a citizen of the United States, residing in the city and county of Philadelphia, State of Pennsylvania, have invented a new and useful Method of Controlling Combustion, of which the following is a specification.

My present invention, in its broad and generic scope, comprehends a novel method of controlling combustion wherein one prominent feature thereof is the automatic control of the fuel feed by means of mechanism which is regulated by the varying conditions posterior to the bed of fuel, such as changes in pressure, and in the typical embodiment herein illustrated, I have shown the fuel feed as being controlled in accordance with variations in furnace pressure.

My invention is designed to be utilized in conjunction with any desired type of a furnace and in conjunction with any desired type of fuel, such as for example, solid, liquid, or gaseous fuel, so that the introduction of such fuel to the point of combustion will be accurately controlled in accordance with the varying conditions which are taking place within the furnace.

A further purpose of this invention is to utilize in conjunction with the automatic control of the fuel feeding mechanism, such as for example, a stoker, or its equivalent, the step of automatically varying the furnace pressure in accordance with the variation in load on the furnace. This load varies in character in accordance with the character of furnace employed, and in a furnace utilizing a steam boiler, the load would be the variation in the demand for steam, while in a heating furnace, it might be the variation in heat within the furnace.

A further purpose of my invention is to so proportion the amounts of air and fuel introduced into the furnace to create and maintain the combustion, that the requisite amount of oxygen to combine with the carbon of the fuel will be provided and automatically controlled by mechanism responsive to and influenced by variations in furnace conditions at a point posterior to the bed of the fuel, such as for example, the combustion chamber of the furnace. By carrying out such steps, the furnace can be operated under conditions which will automatically take care of any and all variations in load on the furnace.

A further purpose of my invention is to employ in conjunction with either natural or forced draft or both, the automatic variation in the pressure posterior to the bed of fuel or the point of combustion in accordance with the variations in load on the furnace, to automatically control the stoker or the fuel feed in accordance with variations in furnace conditions posterior to the bed of fuel, for example, by variations in pressure, and to automatically control the introduction of air for the primary combustion by variations in furnace conditions posterior to the point of combustion, such as for example, variations in pressure conditions within the furnace.

My invention further consists of a novel combination of means for controlling combustion.

Other novel features of construction and advantage will hereinafter more clearly appear in the detailed description of my invention.

For the purpose of illustrating my invention, I have shown in the accompanying drawings typical embodiments of it which are at present preferred by me, since these embodiments will give in practice satisfactory and reliable results, although it is to be understood that the various instrumentalities of which my invention consists, and by means of which my method can be carried out, can be variously arranged and organized and that my invention is not limited to the precise arrangement and organization of these instrumentalities as herein shown and described.

Figure 1 represents, in sectional elevation, one type of a furnace illustrative of one manner of carrying out my novel method in practice.

Figure 2 represents, in side elevation and on an enlarged scale, an automatic regulating device seen in Figure 1.

Fig. 3 shows in sectional elevation the controlling valve seen in Fig. 4; Fig. 4 shows partly in section and partly in elevation the pressure regulator shown in Fig. 1.

Figure 5 represents, in side elevation, another embodiment of my invention, illustrating a different type of fuel feeding mechanism for feeding liquid or gaseous fuel.

Figure 6 represents a section on line 6—6 of Figure 2.

Figure 7 is a view similar to Fig. 1 illustrating another embodiment of my invention.

Similar numerals of reference indicate corresponding parts in the figures.

Referring to the drawings:—

It is to be understood that in carrying out my novel method in practice I do not desire to be limited to any special type of a stoker or fuel feeding mechanism, to any special type of a regulator controlled by the variation in load on the furnace, to any special type of a regulator controlled by varying conditions posterior to the point of combustion, such as for example, a pressure regulator, or to the steps of utilizing natural or forced draft or any special type of mechanism for controlling forced draft.

1 designates a furnace of any desired or conventional type, and as illustrated in the drawings, it is indicative of one of the individual furnaces of a battery of boilers for the generation of steam so that the load on each furnace is the variation in steam pressure. 2 designates the ash pit and 3 the fuel feeding mechanism which is intended to disclose the equivalent of a stoker, and consists of a travelling grate, the movement of which is controlled by an engine 4 of any desired or conventional type and which is illustrated diagrammatically in Figure 1. It will be understood that the engine 4 is operatively connected with the travelling grate 3 in order to impart movement thereto.

5 designates a combustion chamber which is in communication with the individual stack 6, through which the products of combustion pass to the main furnace stack 7. 8 designates a boiler, in which the steam is generated, and from which it is conducted through the dome 9 to any desired point of utilization. 10 designates a pressure regulator of the type which is now well known in the art and which may be constructed substantially in accordance with my prior Patent, No. 1,150,097 dated August 17, 1917 (see Fig. 4), and I will therefore describe this pressure regulator with only sufficient clearness to enable one to comprehend the operation thereof.

11 designates a conduit which is in communication with the combustion chamber 5 and has its free end extending above the liquid in a container 12 and into the chamber 13 of an inverted tank 14. This tank 14 is located within the outer inverted tank 15 and these tanks have their lower ends sealed by the liquid in the container 12. The inverted tanks 14 and 15 are carried at one end of a lever 16 fulcrumed in any desired manner and provided with an adjustable counterbalance 17.

18 designates a link which is connected with a valve 19 which controls admission and discharge of motive fluid through the pipes 20 and 21 to opposite ends of a motor chamber 22, in which is located a reciprocatory piston 23. 24 designates a piston rod, the lower end of which is connected with a lever 25, which is fulcrumed on one end of a link 26, the other end of which is pivotally carried by the frame or housing of the pressure regulator. The free end of the lever 25 is pivotally connected with a valve stem 27 to which is connected a valve 28 having a port 29 through its side wall. This valve 28 is illustrated as a cup-shaped valve slidable in a valve casing 30 which is provided with an inlet 31 and an outlet 32. The inlet communicates by means of a port 33 with the interior of the valve casing 30 and the port 29 registers at times with the port 33. The valve 28 is shown as a cup-shaped valve having the ports 34 through one end to balance the pressure of motive fluid against the valve. The inlet 31 communicates by means of a valve-controlled conduit 35 with the steam dome 9. The outlet 32 communicates by means of a valve-controlled conduit 36 with the engine 4. The piston rod 24 of the pressure regulator 10 has connected to its upper end a cable 37 which passes over pulleys 38 and is connected to a damper 39 in the auxiliary draft conduit 40 which communicates with the ash-pit 2. The damper 39 is provided with an adjustable counterbalance 41. The auxiliary draft conduit 40 communicates with the main draft conduit 42 which is in communication with each furnace of the battery. The furnace may be operated under either a natural or forced draft, and I have illustrated in Figure 1, a draft conduit 43 for the natural draft so that when the damper 44 is closed, the furnaces will operate under natural draft. When the damper 44 is opened, as indicated in dotted lines in Figure 1, the blower 45 is in communication with the main draft conduit 42 so that the furnaces will operate under forced draft. The blower 45 is intended to illustrate the conventional type of forced draft wherein the blower is actuated by an engine 46 which is provided with a governor 47, so that the speed of the engine can be automatically controlled. The engine 46 of the blower is connected by a pipe or conduit 78 with the steam dome of the boiler. In lieu of employing a governor to control the operation of the blower, a by-pass 79 having a hand operated regulating valve 80 may be employed. When the regulating valve 80 is to be used, the valve 81 is closed and the valves 82 in the by-pass opened and the governor disconnected.

Each individual stack 6 is provided with a damper 48 having a counterbalance 49 and provided with a cable 50 which extends into a position accessible to the engineer in order to provide for the manual control of the damper 48. Each individual stack 6 is provided with an automatically controlled damper 51 which is provided with a pulley 52 around which passes a cable 53, which is provided with a counterbalance, 54, said counterbalance being adjustable. The cable 53 is connected to a piston rod 55 of a motor 56. The admission and exhaust of motive fluid to the motor 56 is controlled by means of a pilot valve 57 and the stem of the valve, as indicated by 58, is connected to a lever 59 to which is pivoted an adjustable connection 60, the other end of which is connected with a lever 61. The lever 61 is provided with an adjustable counterweight 62 and an adjustable counterbalance 63. The lever 61 is actuated by a diaphragm motor 64 of any conventional type, one side of which is subjected to variations in steam pressure which is introduced into proximity to said diaphragm through a steam conduit 65 which is in communication with the steam dome 9. The lever 59 is connected by means of a link 66 with an elbow lever 67 which is fulcrumed to a fixed point. This elbow lever 67 carries at one end a shoe 68 which is slidably mounted upon a guide 69 pivoted at its lower end to a fixed point as 70 on a bracket 71 which is adjustably fixed to the piston rod 55 which is connected to the cable 53. The upper end of the bracket 71 is provided with a worm 72 adapted to be manually adjusted and which meshes with a rack 73 at the upper end of the guide 69 in order to provide for the angular adjustment of said guide 69. This bracket 71 and its adjuncts form a compensating mechanism, so that a graduated adjustment of the damper 51 is automatically provided in accordance with variations in the steam pressure.

It will be seen from Figure 6 that the shoe 68 is pivotally carried by the bifurcated end of the lever 67.

In Figure 1, I have illustrated the mechanism for providing an automatic control of the fuel feeding mechanism which can be employed in case a solid fuel is used, and in Figure 5, I have illustrated a typical mechanism which can be employed in case a liquid or gaseous fuel is used. The cable 37 in Figure 5 would be connected to the pressure regulator 10 and controls the auxiliary draft conduit 40 to the individual furnace in the same manner as already described with reference to Figure 1, and I have therefore identified the corresponding parts by the same reference characters. Connected to the cable 37 is a cable 74 which passes around a controlling valve 75 and is provided with a counterbalance 76. The valve 75 automatically controls the passage of fuel of a liquid or gaseous nature through the nozzle or injector 77. The other parts of the mechanism for controlling combustion would correspond to the typical mechanism illustrated in Figure 1.

The operation of my apparatus will now be readily apparent to those skilled in the art to which this invention appertains and is as follows:

The furnaces can be operated under either natural or forced draft, and the mechanism for producing the forced draft is preferably automatically regulated. As the demand for steam increases, or in other words, the load on the individual furnace, the diaphragm motor 64 is actuated to control the pilot valve 57 to thereby admit motive fluid to the motor 56 to cause the damper 51 to move in the direction of opening and thereby decrease the pressure posterior to the point of combustion, such as for example, the furnace pressure in the combustion chamber, since such combustion chamber is now in communication with the atmosphere through the stack 6 of the individual furnace. This change in pressure causes the lever 16 to be actuated to operate the pilot valve 19 and admit motive fluid to the motor 22 and thereby actuate the piston rod 24. The piston rod 24 will move downwardly, thereby causing the lever 25 to move the valve stem 27 upwardly, and steam is permitted to pass from the conduit 35 through the inlet 31, the ports 33 and 29, through the port 32 into the conduit 36 and thence to the engine 4 to cause the fuel to be fed into the furnace. This downward movement of the piston rod 24 actuates the cable 37 to open the valve 39 and permit the draft for combustion to pass from the main draft conduit 42 into the ashpit 2 of the individual boiler.

In order to illustrate one manner of carrying out my method, I have preferred to show a single instrumentality, for simultaneously controlling the operation of the fuel feeding mechanism and the introduction of draft for combustion, but it is to be understood that it is within the scope of my invention to employ separate mechanisms for such control in accordance with conditions and requirements met with in practice. When the load on the furnace decreases, such as for example, a decrease in the demand for steam, the motor 56 will be actuated to cause the damper 51 to close to a degree corresponding to the change in steam pressure, and the fuel feeding mechanism and the primary draft will be correspondingly actuated to decrease the amount of fuel being fed and the amount of air introduced for combustion. Owing to the provision of the compensating mechanism, which is best illustrated in Figures 2 and 6, the damper 51 is not moved to a fully open or closed position on variation in steam pressure but a graduated movement is provided. The bracket 71, carried by the piston rod 55 as it moves in one direction or the other, actuates the shoe 68 to move the valve stem 58 and correspondingly control the pilot valve 57. It is not essential in all cases arising in practice to use all of the steps of my method as herein set forth and they can be used alone and independently of each other or in any combination.

In so far as I am aware, I am the first in the art to devise the step of automatically controlling the fuel feed by variations in furnace conditions posterior to the point of combustion, such as for example, the variations in the furnace pressure. I am also the first in the art, in so far as I am aware, to employ in conjunction with such step, the automatic control of the primary draft in accordance with varying conditions posterior to the point of combustion, either alone or in conjunction with the step of automatically varying conditions posterior to the point of combustion in accordance with variations in load on the furnace or furnaces. It is therefore to be understood that my claims to such features are to be interpreted with the scope to which a generic invention is entitled.

In some cases arising in practice, the damper 51 and its adjuncts may be dispensed with and the damper 48 can be manually controlled to vary the condition of pressure posterior to the point of combustion.

Another embodiment of my invention is seen in Figure 7, wherein instead of controlling the damper 51 by variations in steam pressure, it is controlled by variations in furnace conditions posterior to the point of combustion, such as for example, the furnace pressure. To effect the adjustment of the stack damper 51 by and in accordance with changes of pressure in the furnace, the rope 53 is disconnected from the steam operated mechanism shown in Figs. 1 and 2, and is connected to the rope or chain 37 leading from the upper end of the piston rod 24 of the mechanism operative by and in accordance with changes in the pressure of gases in the furnace as shown in Fig. 4. As indicated in Fig. 7, there will not in such case be any connection from the piston rod 24 to the air controlling damper 39, which of course would either be dispensed with or shifted to full open position.

It will now be apparent that I have devised a new and useful method of controlling combustion, which embodies the features of advantage enumerated as desirable in the statement of the invention and the above description and while I have, in the present instance, shown and described typical embodiments thereof which will give in practice satisfactory and reliable results, it is to be understood that these embodiments are susceptible of modification in various particulars without departing from the spirit or scope of the invention or sacrificing any of its advantages.

It is characteristic of the improvement described herein that as the pressure in the furnace will vary with the rate of flow of gases from the furnace and the feed of fuel and the supply of air will be varied in accordance with changes in pressure in the furnace and the rate of flow of gases from the furnace is regulated by the pressure of steam in the generator, the three steps or operations involved in the combustion of fuel are regulated, controlled or varied by and in accordance with changes in the pressure of steam in the generator.

It is characteristic of the improvement shown and described herein that the pressure in the furnace can be changed either by varying the rate of flow of gases from the furnace, the supply of air remaining constant, by varying the rate of supply of air to the furnace, the discharge of gases remaining constant, or by varying both the discharge of gases and the supply of air. In the embodiment of the invention shown in Fig. 1 any variation in the demand for steam will cause a shifting in the position of the stack damper thereby producing a change in the rate of flow of gases from the furnace and consequent change of pressure of gases in the furnace. This change of pressure will cause the operation of the furnace machine, thereby effecting variations in the rate of feed of fuel and the supply of air. In the embodiment of the invention shown in Fig. 7, a change in the demand for steam will cause a change in the rate of supply of air and consequently an increase in pressure posterior to the fuel bed. The change of pressure posterior to the fuel bed will cause the operation of the furnace machine to shift the stack damper and also change the rate of feed of fuel. It will be understood that in case of change in the condition of the fuel bed affecting the flow of air therethrough, there will be a change in the pressure posterior to the fuel and this change operating through the furnace machine will in the construction shown in Fig. 1 change the rate of supply of air and fuel, and in the construction shown in Fig. 7 the operation of the furnace machine will shift the stack damper and change the rate of feed of the fuel. It is characteristic of the operation of both constructions that the pressure in the furnace, whenever changed from normal by reason of a change in the demand on the boiler will be immediately restored to normal through the operation of the furnace machine, and that the rate of feed of fuel is controlled by the furnace machine.

Having thus described my invention, what I claim as new and desire to secure by Letters Patent, is:—

1. The method of controlling the feed of fuel to a furnace which consists in automatically regulating the fuel feed by and in accordance with variations in furnace pressure.

2. The method herein described of regulating combustion in a furnace which consists in feeding fuel to the furnace, supplying air for supporting combustion in the furnace and regulating the feed of fuel and the supply of air by and in accordance with the pressure of gases in the furnace.

3. The method of controlling combustion in a furnace of a vapor generator which consists in varying the furnace pressure in accordance with variations in the pressure of generated vapor and then utilizing the variations in pressure thus produced to automatically control the feed of fuel.

4. The method of controlling combustion in a furnace which consists in varying the furnace pressure posterior to the point of initial combustion and controlling the feed of fuel and the introduction of draft for combustion by the variations in furnace pressure thus produced.

5. The method of controlling combustion in a furnace of a vapor generator which consists in automatically varying the furnace pressure in accordance with variations in the pressure of generated vapor, and then utilizing the variations in pressure thus produced to automatically control the feed of fuel.

6. The method of controlling combustion in the furnace of a steam generator which consists in automatically varying the furnace pressure in accordance with the variations in steam pressure and controlling by variations in furnace pressure the fuel feed and the draft for combustion.

7. The method of regulating combustion in the furnace of a steam generator said method involving the feed of fuel, the feed of air and the discharge of products of combustion which consists in regulating the discharge of products of combustion by and in accordance with changes of pressure of steam in the generator and varying the feed of fuel and the feed of air by and in accordance with changes of pressure in the furnace due to variations in the discharge of products of combustion.

FRANCIS H. BROWN.

Witnesses:
H. S. FAIRBANKS,
CHAS. H. BROWN.